United States Patent
Lee

(10) Patent No.: US 7,144,019 B2
(45) Date of Patent: Dec. 5, 2006

(54) WHEELBARROW GARBAGE CAN

(75) Inventor: Nathaniel Lee, Mobile, AL (US)

(73) Assignee: Equity Investor Group LLC, Mobile, AL (US)

( * ) Notice: Subject to any disclaimer, the term of this patent is extended or adjusted under 35 U.S.C. 154(b) by 116 days.

(21) Appl. No.: 10/736,021

(22) Filed: Dec. 15, 2003

(65) Prior Publication Data

US 2004/0124198 A1 Jul. 1, 2004

Related U.S. Application Data

(60) Provisional application No. 60/436,612, filed on Dec. 16, 2002.

(51) Int. Cl.
*B62B 1/10* (2006.01)

(52) U.S. Cl. .............. 280/47.26; 280/47.24; 280/47.18; 280/47.17; 280/47.131; 280/652; 280/653; 280/654; 280/655; 280/659; 280/43.1

(58) Field of Classification Search ........ 280/653, 280/654, 655, 659, 43.1, 651, 652, 47.131, 280/47.17, 47.18, 47.24, 47.26, 30
See application file for complete search history.

(56) References Cited

U.S. PATENT DOCUMENTS

| | | | | | |
|---|---|---|---|---|---|
| 2,667,397 | A | * | 1/1954 | Hallisey | 312/249.8 |
| 3,941,398 | A | * | 3/1976 | Nelson | 280/47.19 |
| 5,071,147 | A | * | 12/1991 | Stansbury | 280/47.19 |
| 5,842,595 | A | * | 12/1998 | Williams | 220/495.11 |
| 5,899,468 | A | * | 5/1999 | Apps et al. | 280/47.26 |
| 6,053,354 | A | * | 4/2000 | Niemeyer | 220/819 |

* cited by examiner

*Primary Examiner*—J. Allen Shriver
*Assistant Examiner*—Cynthia F. Collado

(57) ABSTRACT

A garbage can which has: a) a bottom section; b) a top section; and c) a connecting means for connecting the bottom of the top section to the top of the bottom section. The bottom section has at least one axle; and at least one wheel. The top container defines a slanted bottom corresponding in shape to the slanted top of the bottom section so when separated the two sections defines a slanted opening. The slanted opening is at an angle less than 90 degrees from the back of the container. The axle tube has a first position and a second position along the container bottom. The first position and second position releasably hold the axle when the axle is in place. The bottom has a handle adjustable relative to the back of bottom section. The top section has a removable cover. The top section has a bag grip to hold a bag over the opening when the removable cover is removed.

10 Claims, 11 Drawing Sheets

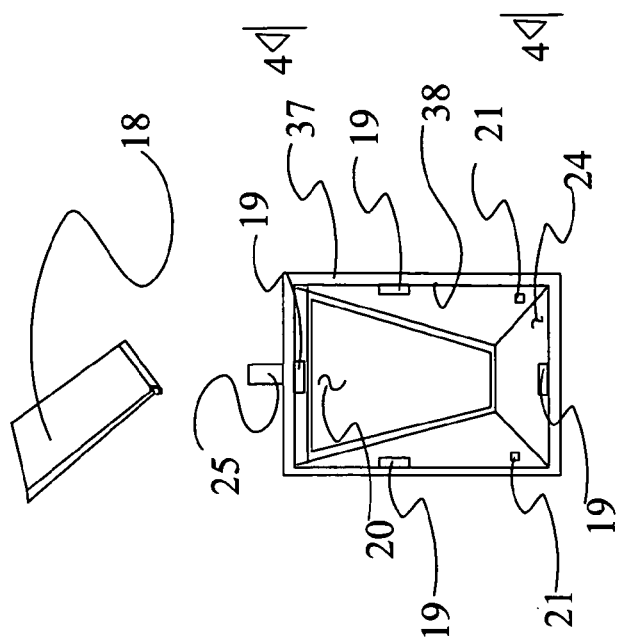
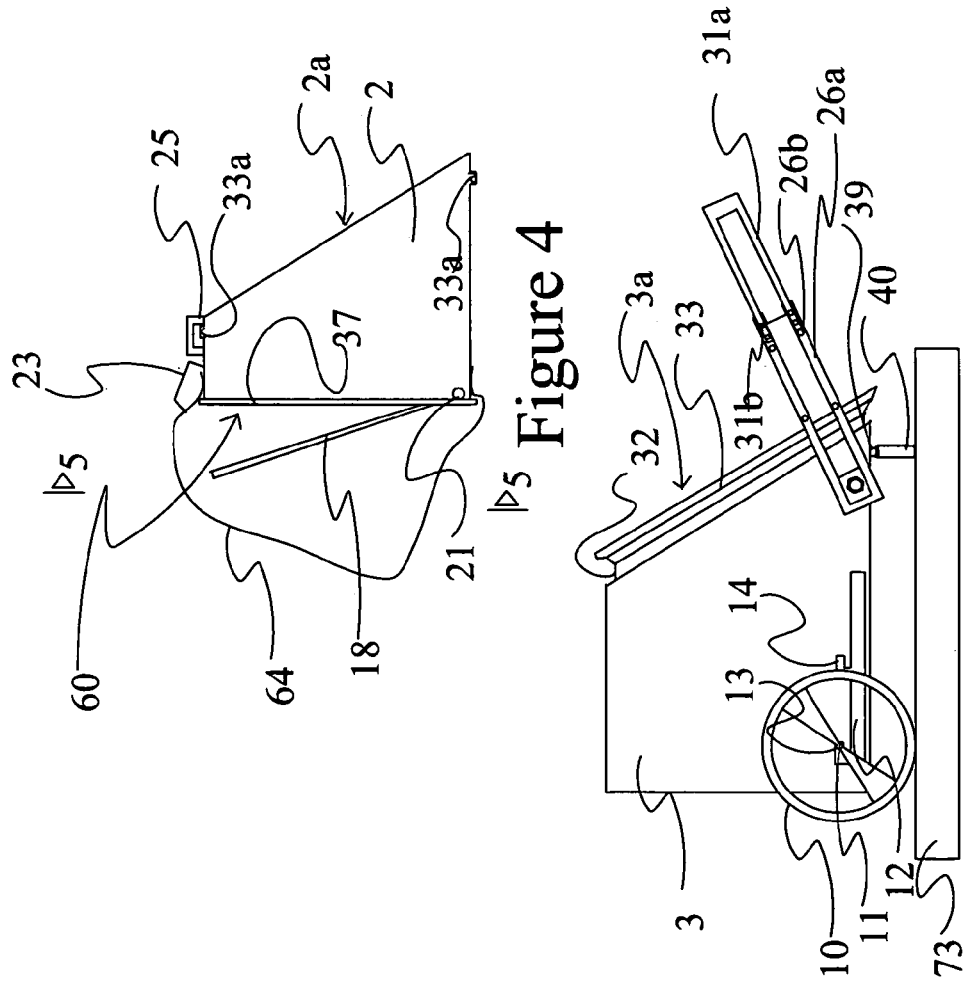
Figure 5
Figure 4
Figure 3

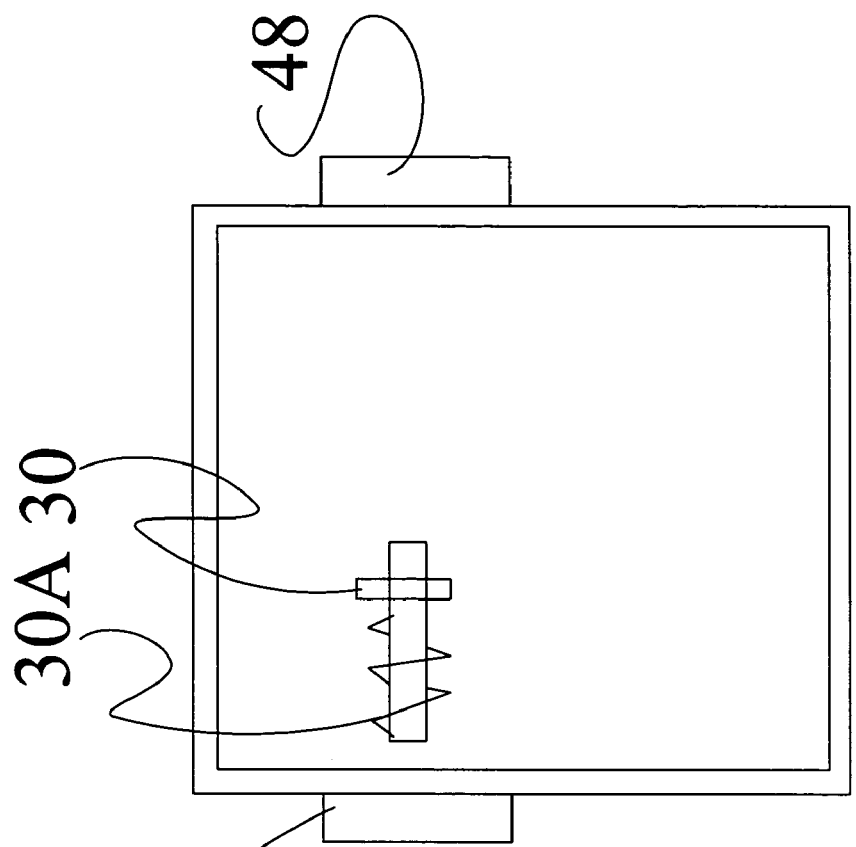
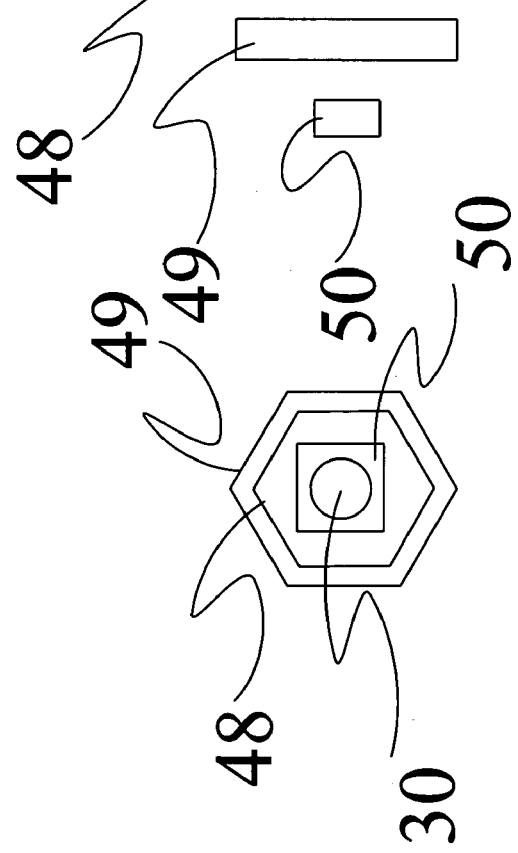
Figure 9
Figure 10

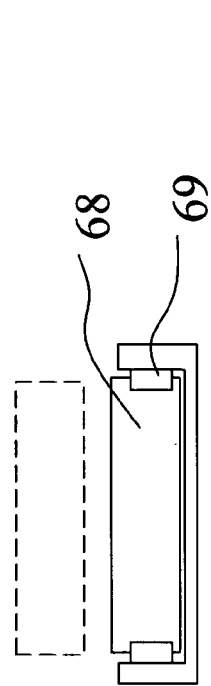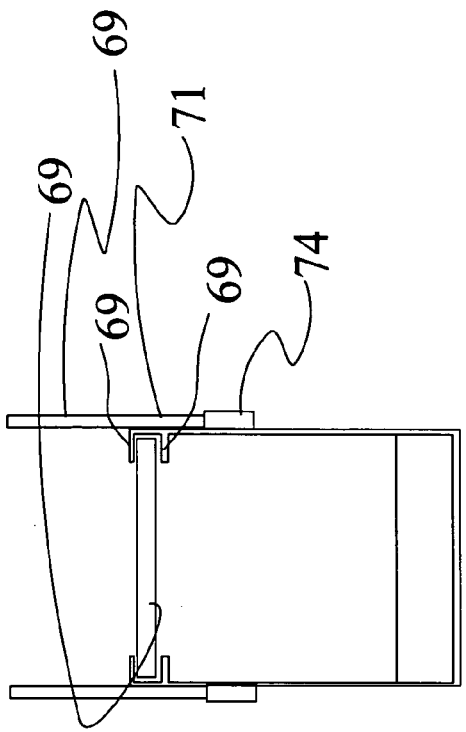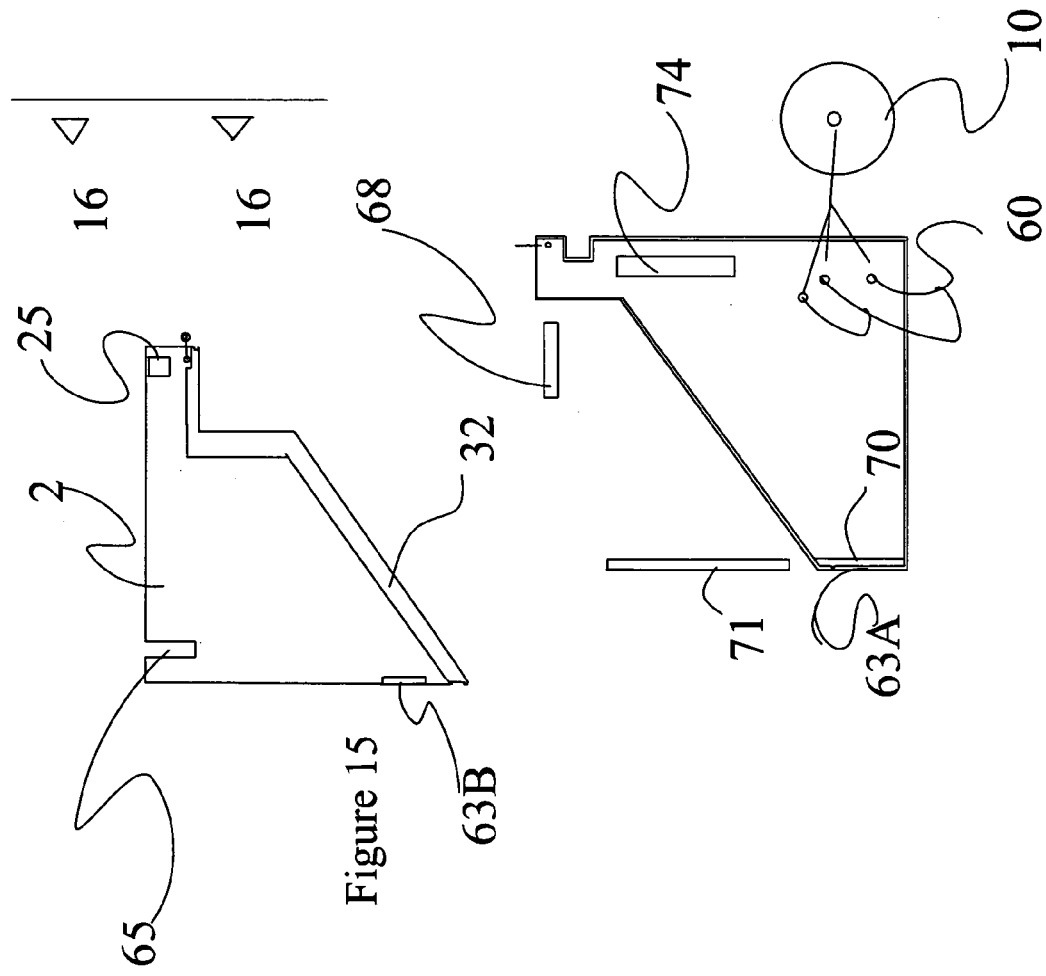

WHEELBARROW GARBAGE CAN

PRIORITY

This patent is a continuation of Provisional Patent: 60/436,612 filed Dec. 16, 2002.

BACKGROUND OF INVENTION

1. Field of the Invention

The present invention relates to garbage cans and wheel barrows.

2. Prior Art

Garbage cans are known in the art. Wheeled garbage cans are known in the art. Wheelbarrows are well known in the art.

GENERAL DISCUSSION OF THE INVENTION

The present invention is a wheelbarrow convertable into a garbage can having several unique features including features related to adjustability and carrying.

The main features of this invention are to have a slanted interface between a bottom section and a removable top section, providing an opening in the top of the bottom section and opposite this opening providing for wheels which are adjustable along the length of the bottom section so that the wheels may be positioned to allow the device to function as a wheelbarrow or to function as a garbage can.

The top is designed to fill other functions other than to just close the wheelbarrow to form a garbage can.

One of the functions of the top is to allow it to be used as a scoop in conjunction with or separately from the garbage can.

In conjunction with this it is possible to have a temporary support for garbage bags usable in conjunction with the can so that when the scoop is being used the an can still be used in order to hold leaves and the like.

It is therefore one object of the invention to provide for a wheelbarrow which is convertable into a garbage can.

It is another object of the invention to provide a garbage can which is convertable into a wheelbarrow.

There is another purpose of the invention to provide for a garbage can which may be broken down to provide a handle to scoop up leaves and other debris and also to deposit the scooped up product directly into a garbage bag.

It is a further a purpose of the invention to replace three products, those being a scoop, a garbage can, and a wheelbarrow with this simple product.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein:

FIG. 3 shows a side view of the wheelbarrow portion of the garbage can.

FIG. 4 shows a side view of the top of the garbage can which is a scoop.

FIG. 5 shows a front view of the scoop through the 5—5 axis of FIG. 4.

FIG. 9 shows a front view of a locking mechanism for locking the position of the handle 26.

FIG. 10 shows a side view of the locking mechanism shown in FIG. 9.

FIG. 15 also shows where a brace can be provided in order to allow the scoop to be used to scoop leaves and then dump them into a garbage bag held between the brace and the bottom wall of the bottom section so that the bottom section can continue to function as a garbage can even when the top is removed.

FIG. 16 shows a front view of the closure from FIG. 15 through the 16—16 axis.

FIG. 17 shows a top view of the garbage can shown in FIG. 15.

DETAILED DESCRIPTION OF THE PREFERRED EXEMPLARY EMBODIMENTS

Figure 1:
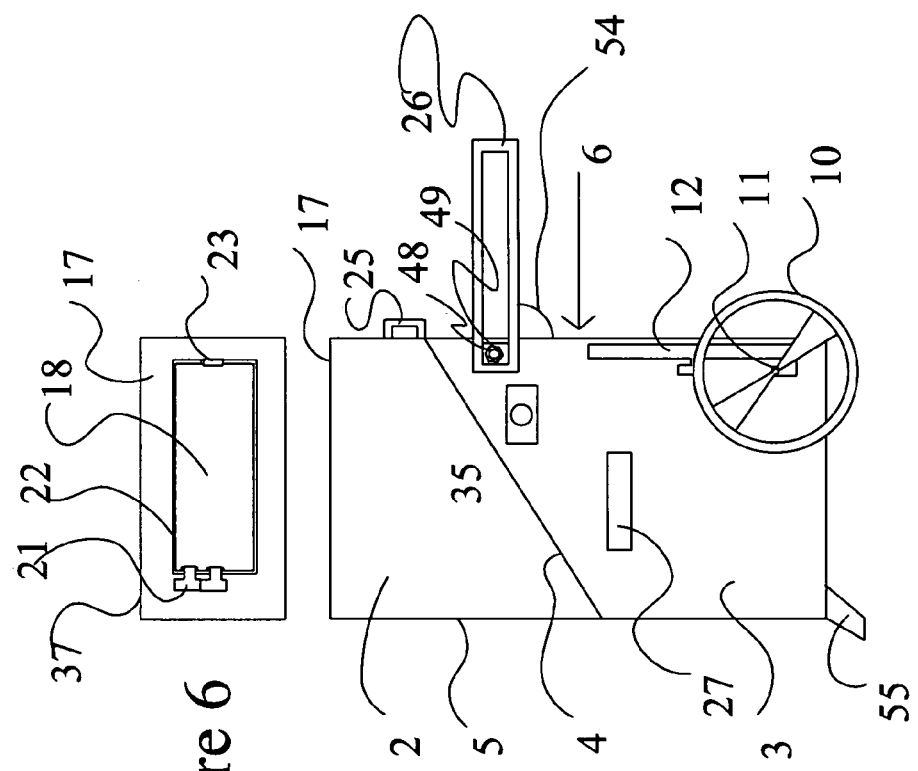
FIG. 1 shows a side view of the preferred embodiment of the garbage can.

As can best be seen by reference to FIG. 1 the can 1 comprises a top section 2, a bottom section 3, and an interface 4 between the bottom 2a of top section 2, and the top 3a of the bottom section 3 shown in FIG. 3 and FIG. 4.

Figure 8:
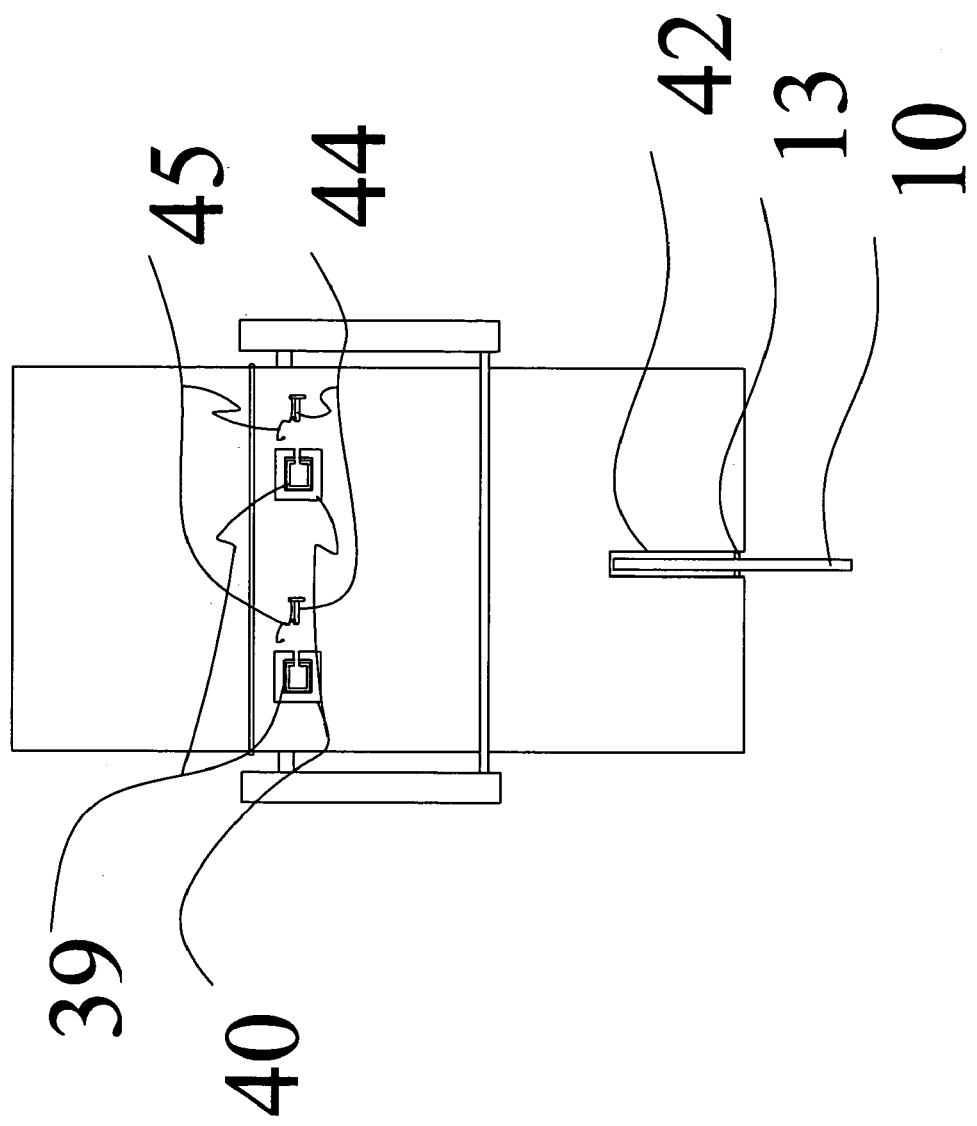
FIG. 8 shows a rear view of an alternate embodiment of the garbage can of FIG. 2 showing the use of a single wheel 41 and two legs.

Also shown in FIG. 8, this invention may be practiced with a single wheel 101 held by single wheel axle 13 which may fit within a slot 42 within the wheel barrow.

In this case there would have to be at least one foot on which the wheel barrow could rest. There may be an extended foot 55 as shown in FIG. 1 which foot 55 is along the front of the wheel barrow in order to provide balance when it is stood upright although the foot could be a part of the front of the bottom 3.

This angled interface 4 provides that the design of the top 2 is in the form of a scoop as described in more detail in reference to FIGS. 4 and 5. One aspect of the invention is that the angle 51 of interface 4 is less than 90 degrees and preferably less than 65 degrees. The angle 51 is from the back 6 where the wheel is held or which is parallel with the ground when the wheel is used for a wheelbarrow. While preferably the bottom is square, it may be rounded in other embodiments.

There are handles which are preferably an integral part of the garbage can, as shown in FIG. 1.

There may be a handle on the left 8 and the right 7, shown as the middle handle 27 in FIG. 1. This allows the bottom section 3 to be lifted.

There is also an alternate handle 66 shown on the sides which may be controlled by either hand of the user as opposed to the handle 25 shown in FIG. 4.

The handle 28 and 29 may lock in several positions according to how the invention is utilized. One locking means is shown in FIG. 9 and FIG. 10 wherein there is a multi sided nut 48 (hexagonal) welded on or made an integral part of the left side 8 and right side 7 of the bottom section 3. In this case, an axle bolt 30, having a threaded end 30(a), fits through the nut 48. A locking bolt 49 can be locked in place because an outer locking bolt 49 has an inner-perimeter shaped identically and having approximately the same size as the outer perimeter of the bolt 48 and the two may be held together or disconnected by a nut 50 which attaches to the threads 30a of the handle axle bolt 30. The locking bolt 49 is preferably an internal part of the handle 28 and 29. This provides for multiple attachment angles 54 of the arm 28 and 29 relative to the rear 26 of the can. There is an identical arrangement on the opposite side of the can with a second axle bolt 34 shown in FIG. 2

Referring to FIG. 3, it can be seen that the bottom handle 26 may have an extension 31. The length of the extension 31 is preferably controlled by having tubes 31a and 31b slide within openings 26a and 26b on the primary handle and can further be secured by way of a pin passing through the holes 26a and 26b in the handle into the holes in 31a and 31b in the extension.

Figure 2:
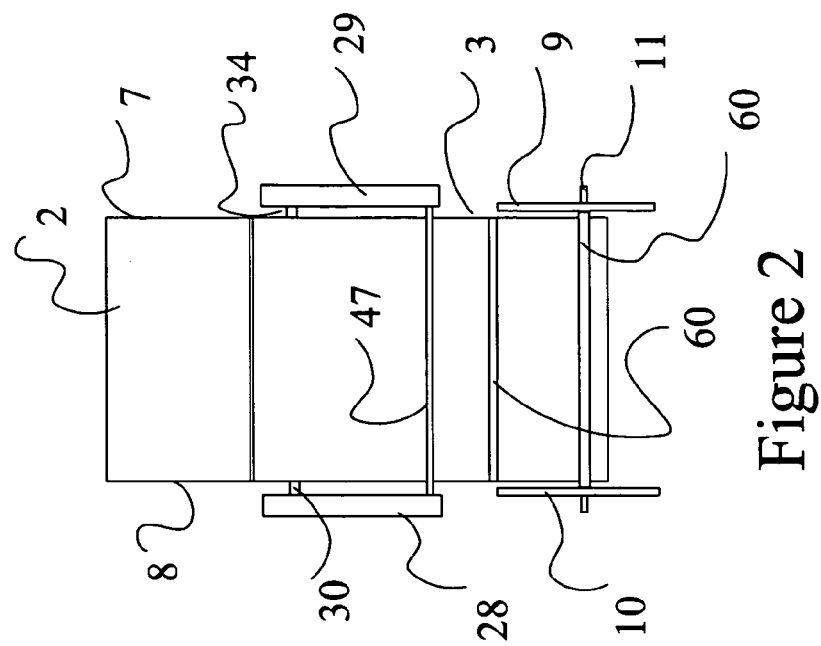
FIG. 2 shows a rear view of the garbage can from FIG. 1.

Handle extension tubes 31a which fit into bottom handle tubes 26a and holes 26b can be aligned with holes 31d and locked together as by a pin 31c through holes 26a and 26b when aligned in order to adjust the length The arms may be desired at various angles relative to the bottom for various purposes depending on whether or not the device is utilized as a wheelbarrow or a garbage can and, as shown in FIG. 2, the arms may be folded down out of the way on the front or on the rear depending on their length.

A third handle, top handle 25, may be utilized to move the can or to hold the top section as a scooper. The top handle 25 allows for top 2 to be utilized as a scoop, holding the handle 25 in a manner which is described in more detail relative to FIGS. 4 and 5.

FIG. 2 shows that the back wheels 9 and 10 may be on an axle 11 passing through one of two axle tubes 60 affixed to or as an integral part of the back 6 of the bottom section 3.

Figure 7:
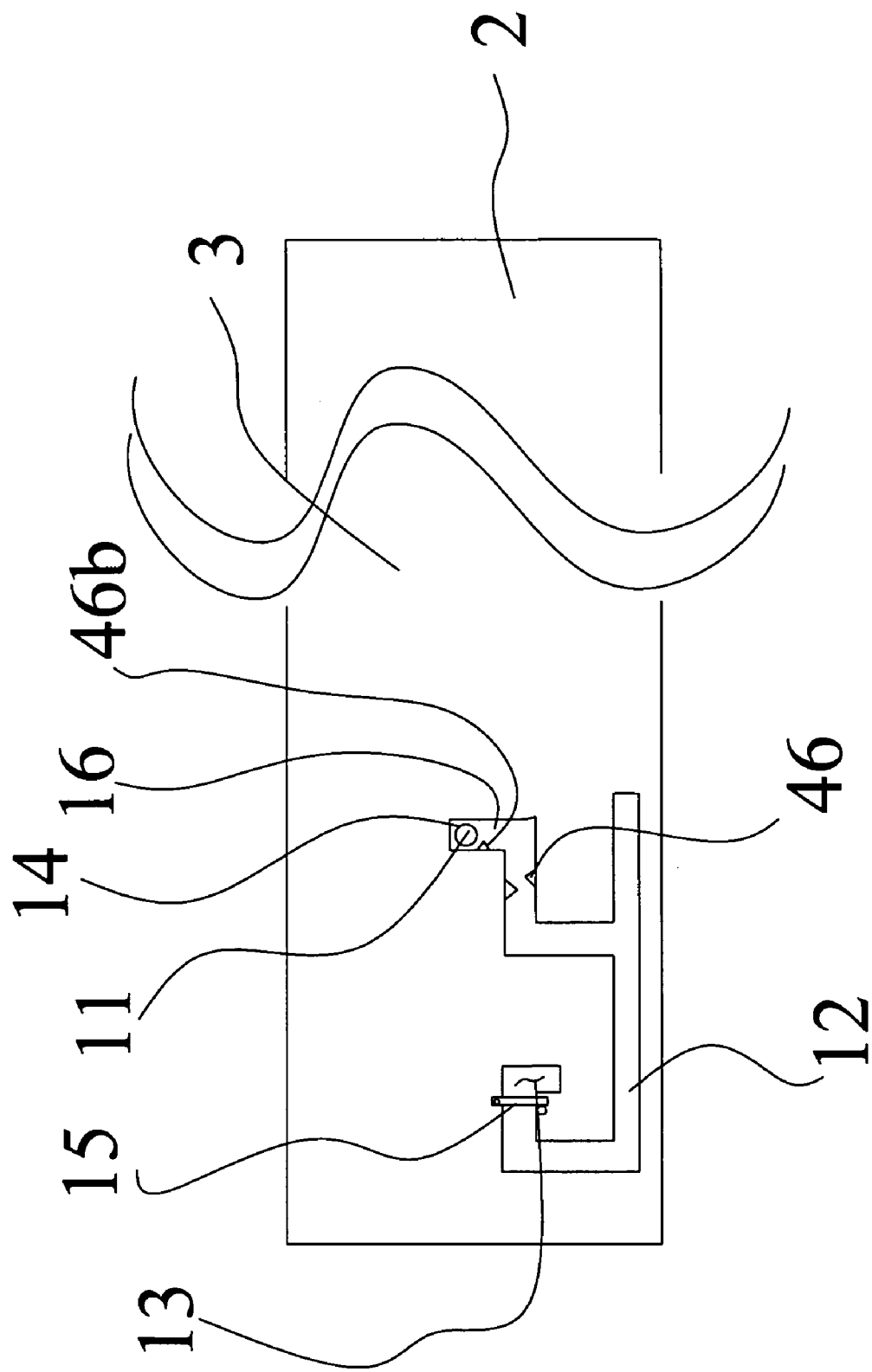
FIG. 7 shows one method of locking the position of the wheels which may also be used for locking the position of the handle.

As can best be seen by reference to FIG. 1 and FIG. 7, in other embodiments there may be a wheel slot 12. With this slot 12, the wheel 10 may move from a first wheel position 13 and at least one second wheel position 14 in order to allow the wheel to move between at least two locations (position 13 and 14) so it is underneath a can in one use or below the bottom of a wheelbarrow in another. There may be a wheel lock 15 which may flip up to let the axle past and flip down after the axle 11 passes. Alternatively, the axle may be secured by having a flexible reduced diameter 46 in the slot 12 as shown. There may alternatively or additionally be a wheel cut out 16 into which the axle 11 may move to further secure it as shown in the second wheel position 14, here with a second reduced diameter 46b.

The purpose of moving the wheel axle 1 along the slot 12 is in order to allow for the location of the wheel and center of gravity of the device to be varied in accordance with the use and load of the device.

In addition to allowing the movement of the wheel between positions 13 and 14, it is also possible that there can be one or more leg attachments 39, welded to or made as a part of bottom section 3 to which a leg 40 may be attached or extendable therefrom, as shown in FIG. 3, to allow the opening in the front of the wheelbarrow (at the top of the bottom section) to be held up from the ground.

Figure 12:
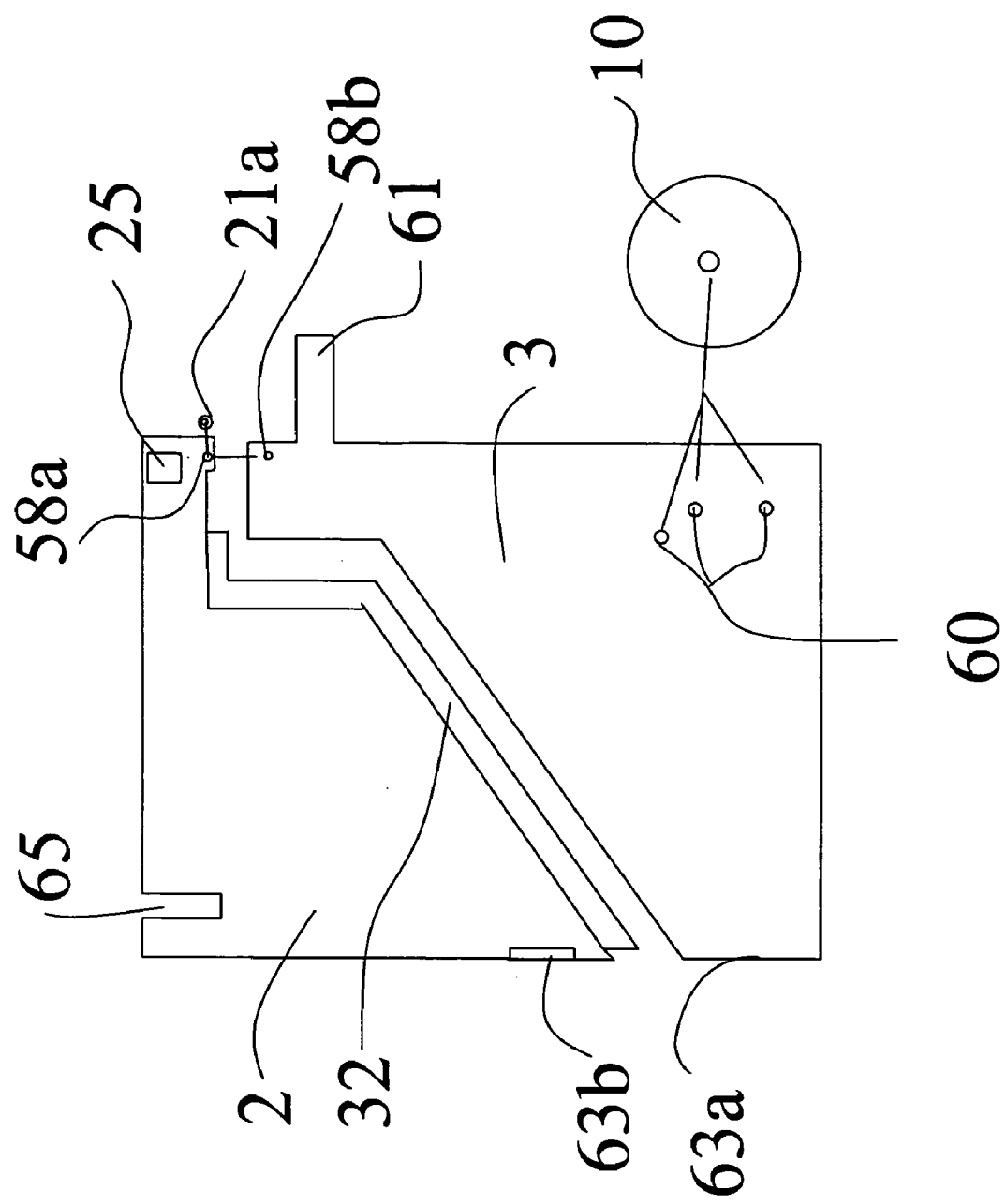
FIG. 12 shows a second alternate garbage can design.

FIG. 12 shows a fixed handle 61 used in place of the handle 26 and extending from the back 6. This handle 61 may act in place of the leg attachment 39 and leg 40. Other handles formed by recesses are shown as 65 in FIG. 12.

As shown in FIG. 8 the feet 40 in the bottom section connect to a square leg attachment 39 and slides into the square leg attachment 39 and then may be secured with a pin 44 which goes through both the leg 40 and leg attachment 39. The pin may be secured to the can with a flexible cord 45 to prevent it from being lost.

Since it is important that the top section 2 remain attached to the bottom section 3, as seen in FIG. 3, there is a sleeve 32 over which the bottom section 2 (scoop) bottom 2a tightly fits. There may be a flexible extension 33 (such as rubber) at the end of the sleeve 30 to hold with friction the bottom section to the top section. The bottom 2a may also define a bottom sleeve 62 shown in FIG. 5 around the perimeter of the bottom 2a of the top section 2 into which a flexible extension 33 can fit to lock the two pieces together when utilized together. Other locking mechanisms may be substituted for the extension/sleeve arrangement as described herein.

Figure 6:
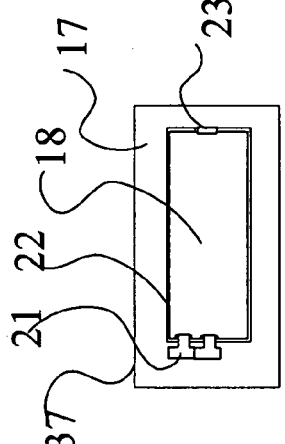
FIG. 6 shows a top view of the top section of the can shown in FIG. 1.

As can best be seen by reference to FIGS. 4 and 5, there is a top opening 24. Around this top opening 24 may be cover rims 19 which may support a cover 18 (shown in FIGS. 4 and 6). Cover 18 may be detached in order to provide that the top section 2 may be opened on both ends. There may be hinges 21 onto which the cover 18 is removably attached as well as a clip 23 to releasably hold the cover 18 closed opposite the hinges 21. The hinges may be placed on the top or inside the top section.

Preferably, there is at least one preferably flexible clip 23 into which the cover snaps and the cover may be pulled loose and unsnapped with the application of sufficient force on the cover 18 or clip 23.

In the preferred embodiment, there is at least one cover plate opening at the bottom 2a of the scoop defined by the top 2 so that leaves and other debris may be scooped up within the top section 2 and may feed directly to a bag 64 which may be attached around the bag grip 37 which has a diameter sufficient that a flexible bag 64 may be stretched over it and then snapped behind the grip 37. The bag may be tied around grip 37. The top perimeter 38 is preferably narrower than the grip 37 in order for bag to be held behind grip 37.

Figure 13:
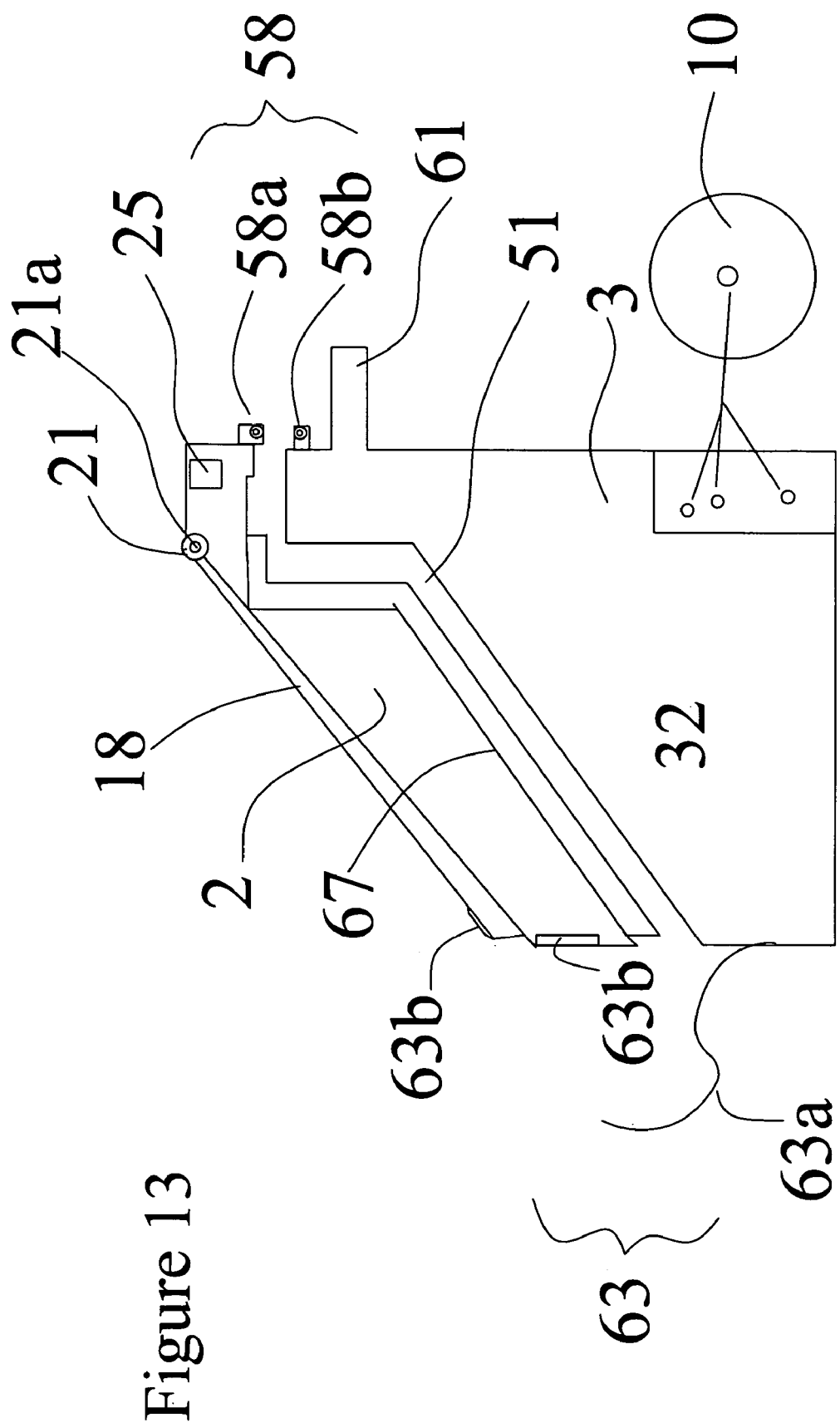
FIG. 13 shows a third alternate garbage can design.
Figure 14:
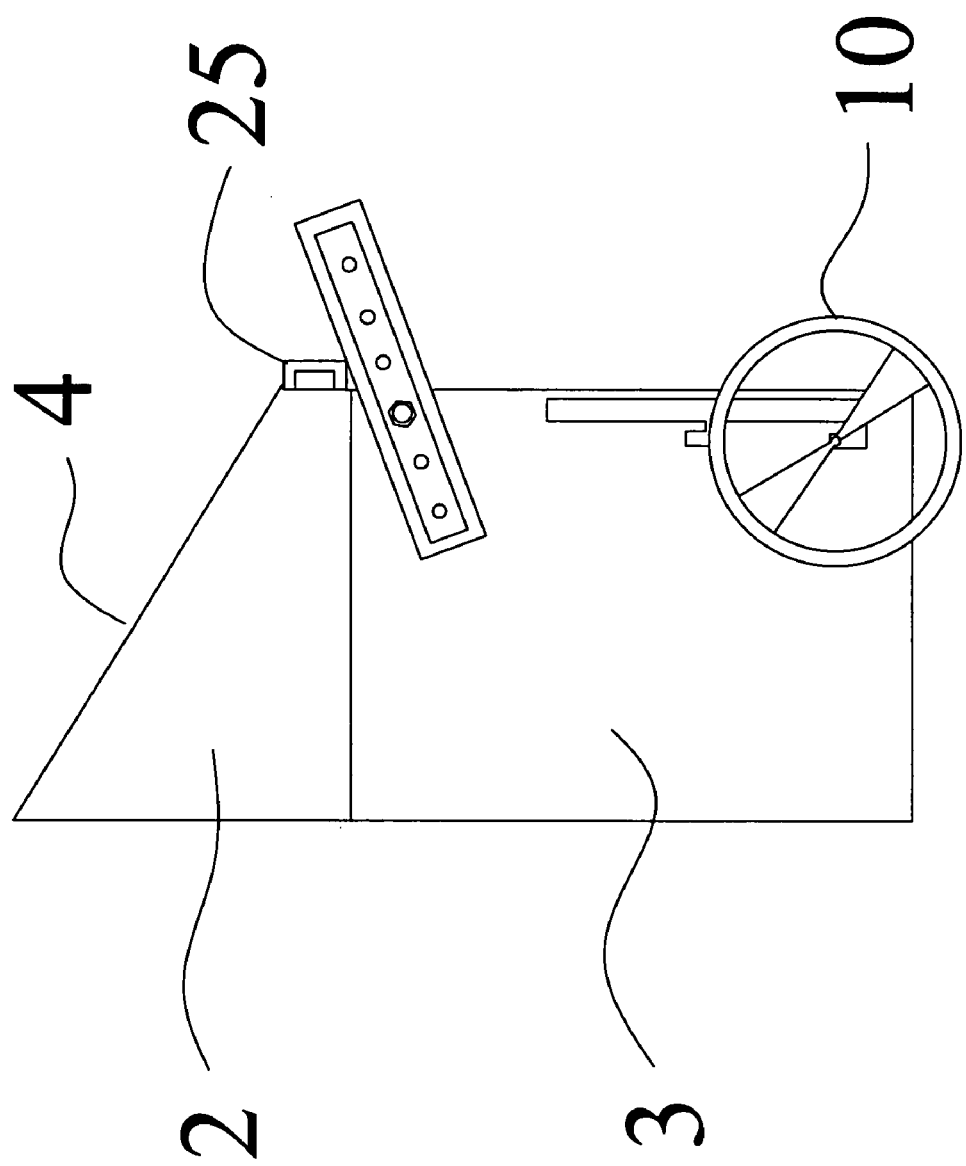
FIG. 14 shows a fourth alternate garbage can design where the scoop is open at the top instead of at the bottom.

FIG. 13 shows how the narrow top section 2 may swivel around swivel 58 made up, like a door hinge, of a top swivel 58a and bottom swivel 58b attached to the top and bottom sections respectively as shown and how the cover may swivel up around cover hinge 21. Cooperating hook and loop fastener 63 comprised of cooperating strips 63a attached to the bottom and opposing strips 63b attached to the top hold the top section 2 and cover 18 to the bottom section opposite the swivel 58 and hinge 21 in this embodiment. The cover 18, as shows may fit over the entire top section in this manner and be removed by removing a pin 21a from the cover hinge 21.

As shown in FIG. 13, the sleeve 32 is on the top section 2 and fits within the top 3a of the bottom section 3. This arrangement prevents garbage going into the top of the can from going into the gap between the sleeve 32 and the top of the outer wall 67 of the top section. The outer wall 67 extends out slightly more than the sleeve 32 so that the sleeve 32 fits within the opening at the top of the bottom section and the top of the bottom section contacts the wall 67 so that the top does not slide completely within the bottom.

The bag may be held by the hook and loop fasteners with one half on the bag and the other half in place of the grip 37.

Figure 11:
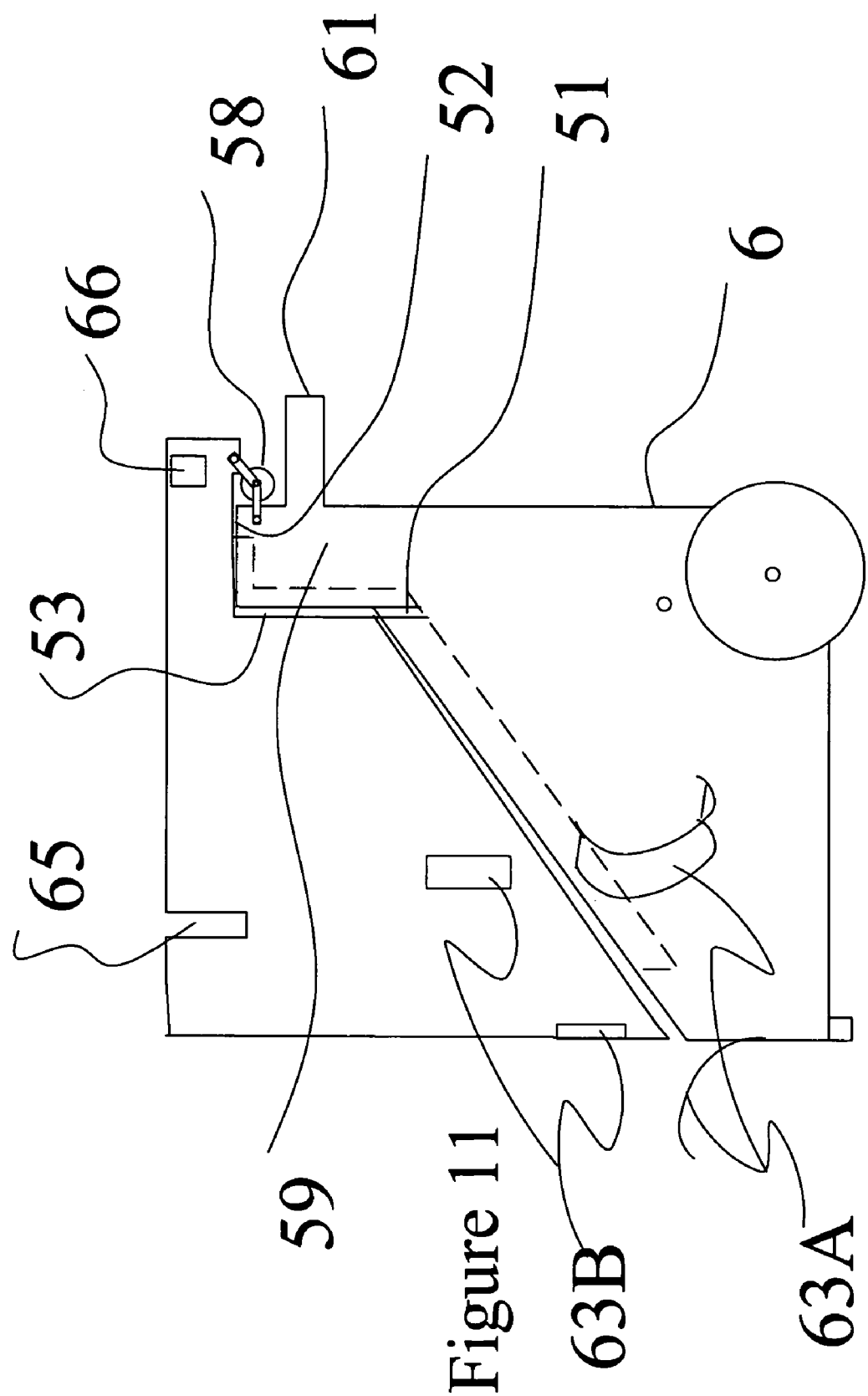
FIG. 11 shows an alternate garbage can wheelbarrow design.

As shown in FIG. 11, in one embodiment, there would be a lip 52 from which a front wall 53 would extend and the angle 51 from the front wall upward would provide for the slanting face described in the invention. The purpose of this would be to provide more open area in the front of the wheelbarrow as defined.

As shown in FIG. 11, there may also be a lip 52, so that the angle 51 of the interface 4, relative to the back 6 of the bottom section 3 may begin lower (in this case between 1 inch and ½ the back length from the top of the back 6 of the bottom section 3) in order to have a better wheelbarrow with a low front wall 59 at the wheelbarrow top 2a. In FIG. 11, it can be seen that there is a front wall 59 having a top 53 which is lower providing a front wall 59 which may vary according to the needs of the user.

Likewise, in FIGS. 1 and 3, it is shown that the attachment angle may extend essentially the entire length of the wheelbarrow for purposes sought therein.

There are preferably two wheels being a right wheel 9 and a left wheel 10. While normally, these would be at the bottom as shown in FIGS. 1 and 2. As shown in more detail in FIG. 7 there is a slot 12 which allows for the position of the wheels 9 and 10 to be moved from one location to at lease one second location depending on the needs of the user.

As shown in FIG. 2, it is preferably the case that there will be enough room for a handle either on the top or on the side of the top section which is also the scoop. There may also be a foot hole 65, as shown in FIG. 11 so that the user can stick his foot within the foot hole in order to provide additional control for the scoop made of the top section 2.

There may be one or more snap locks 56 having a first hand 56a attached to the top and a second hand 56b attached to the bottom to further secure the top to the bottom and this may also be accomplished by interlocking hooks 63b and loop straps 63b is attached half to the top and the other half attached to the bottom in order to secure the top section and bottom section together.

In one embodiment, there is an angle downward from the wheel to the ground so that the top is essentially flat and the bottom is angled in one direction towards the ground when the garbage can is sitting erect. This may be accomplished by having the foot 55 so that the bottom is flat or there may be a drain at the bottom so that water collecting in the can may drain out at that one spot at the bottom for purposes defined by the user.

While FIG. 1, FIG. 3 and FIG. 7 show the slot 12 as being embedded within the garbage can. FIG. 19 shows how the slot may be defined along the exterior of the garbage can so that instead of being a slot 12 it is just an indention 12a which still defines a first and second location for the first location 13 and a second location 14 for the wheel, in this case both being sealed by a reduced diameter 46. FIG. 19 also shows how there may be a cover which may fold up for the wheelbarrow front being shown as front cover 68.

Alternate versions of the front cover 68 are shown in FIGS. 15, 16, and 17 which shows front cover 68 which can slide between brackets 69 which are located at the top of the bottom section in order to allow the wheelbarrow to be closed at the front or open at the front depending on the insertion or removal of the front cover 68.

It is noted that in FIGS. 15, 16, and 17, the front cover preferably only seals a small portion of the front while in FIG. 19 the front cover is sufficiently tall to seal the entire top of the bottom section which becomes the front of the wheelbarrow.

Figure 18:
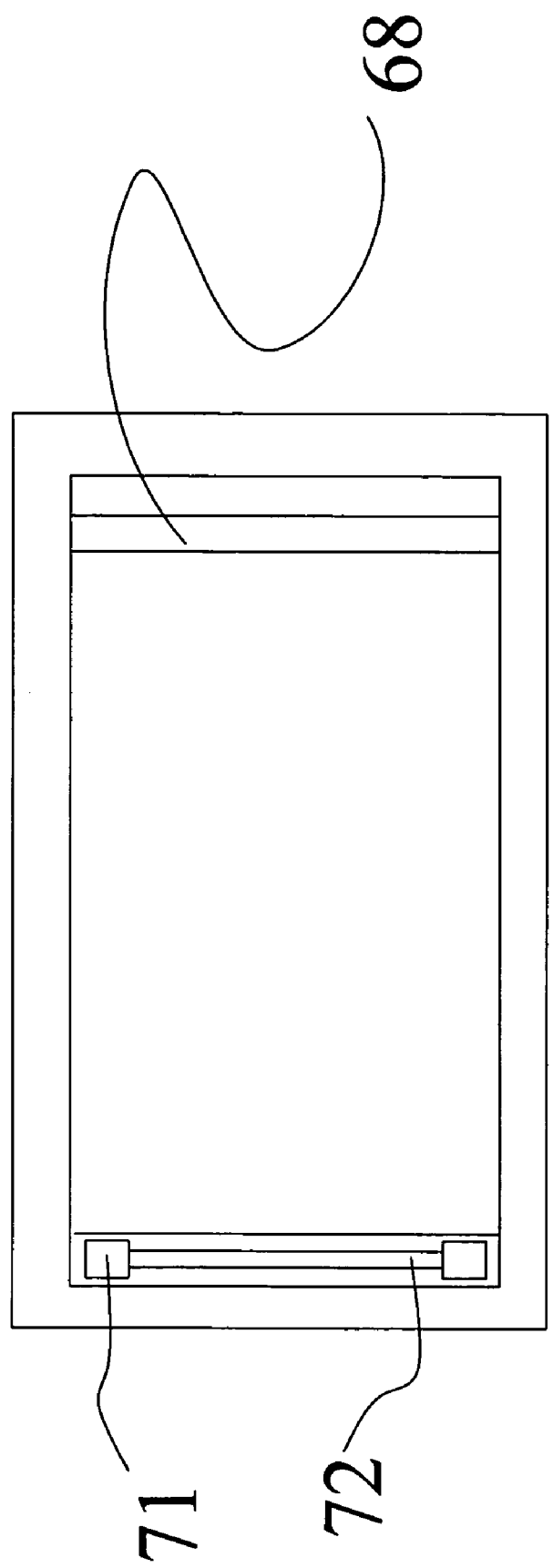
FIG. 18 shows a top view of the can shown in FIG. 15 showing how two braces may be used to hold the top of a bag while the back wall is used for the other side of the bag.

FIG. 15 also shows a slot 70 into which a pole 71 may be inserted on either side as shown in FIG. 18 with a rod 72 running between either pole 71 so that a garbage bag may be inserted over the poles 71 and rod 72 on one side and over the bottom of the wheelbarrow as modified shown as 73 on the other side so that a garbage bag may be held in it while the scoop is utilized to fill the garbage bag. In the preferred embodiment this is not necessary since the scoop itself holds the garbage bag.

One either side, in this embodiment, there are tubes 74 on either side into which these poles 71 may fit to give handles to pull the wheelbarrow.

Different size wheels can be used at different locations.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

I claim:

1. A garbage can usable over a ground surface comprising:
   a) a bottom section having a top defining a perimeter, a bottom, a left side, a right side, a front, a back and said top defining an opening and wherein the front and back have a length and the front length is less than the back length;
   b) a top section having a top, a bottom defining a perimeter, a left side, a right side, a front, a back and defining opening in the bottom said top, front and back having a length;
   c) a connecting means for releasably connecting the bottom of the top section to the top of the bottom section;
   d) a mounting means attached to the bottom section and for holding an axle and at least one wheel rotationally mounted to allow vertical or horizontal positioning of the back of the bottom section and further comprising a handle means attached to the bottom section with a handle for allowing vertical or horizontal positioning of the back of the bottom section comprising at least one handle extendable behind the back and beyond the top of the bottom section.

2. A garbage can usable over a ground surface comprising:
   a) a bottom section having a top defining a perimeter, a bottom a left side, a right side, a front, a back and said top defining an opening and wherein the front and back have a length and the front length is less than the back length;
   b) a top section having a top, a bottom defining a perimeter, a left side, a right side, a front, a back and defining opening in the bottom said top, front and back having a length;
   c) a connecting means for releasably connecting the bottom of the top section to the top of the bottom section,
   d) a mounting means attached to the bottom section and for holding an axle and at least one wheel rotationally mounted to allow vertical or horizontal positioning of the back of the bottom section and; wherein a hypothetical line from the top of the back of the bottom section running to the top of the front of the bottom section defines an angle and wherein the angle is less than 75 degrees and wherein the top of the top section defines an opening in the top and a cover means for removably covering the opening.

3. A garbage can usable over a ground surface comprising:
a) a bottom section having a top defining a perimeter, a bottom a left side, a right side, a front, a back and said top defining an opening and wherein the front and back have a length and the front length is less than the back length;
b) a top section having a top, a bottom defining a perimeter, a left side, a right side, a front, a back and defining opening in the bottom said top, front and back having a length;
c) a connecting means for releasably connecting the bottom of the top section to the top of the bottom section,
d) a mounting means attached to the bottom section and for holding an axle and at least one wheel rotationally mounted to allow vertical or horizontal positioning of the back of the bottom section; and wherein a hypothetical line from the top of the back of the bottom section running to the top of the front of the bottom section defines an angle and wherein the angle is less than 75 degrees and wherein the attachment means is at least one axle tube having a first position and a second position along the back of the bottom section.

4. The invention of claim 3 wherein the first position and second position releasably hold the axle.

5. The invention of claim 4 wherein the axle tube is a slot defined in the back of the bottom section.

6. A garbage can usable over a ground surface comprising:
a) a bottom section having a top, a bottom left side, a right side, a front, a back and defining opening in the top and wherein the front and back have a length and the front length is less than the back length;
b) a top section having a top, a bottom, a left side, a right side, a front, a back and defining opening in the bottom said top, front and back having a length;
c) a connecting means for releasably connecting the bottom of the top section to the top of the bottom section comprising a means for interlocking the top section bottom with the bottom section top perimeter along the perimeter;
d) a mounting means attached to the bottom section and for holding an axle and at least one wheel rotationally mounted to allow vertical or horizontal positioning of the back of the bottom section and wherein the attachment means is at least one axle tube having a first position and a second position along the back of the bottom section and wherein the first position and second position realizably hold the axle and wherein the axle tube is a slot defined in the back of the bottom section.

7. A garbage can usable over a ground surface comprising:
a) a bottom section having a top defining a perimeter, a bottom a left side, a right side, a front, a back and said top defining an opening and wherein the front and back have a length and the front length is less than the back length;
b) a top section having a top, a bottom defining a perimeter, a left side, a right side, a front, a back and defining opening in the bottom said top, front and back having a length;
c) a connecting means for releasably connecting the bottom of the top section to the top of the bottom section;
d) a mounting means attached to the bottom section and for holding an axle and at least one wheel rotationally mounted to allow vertical or horizontal positioning of the back of the bottom section; and wherein a hypothetical line from the top of the back of the bottom section running to the top of the front of the bottom section defines an angle and wherein the angle is less than 75 degrees and wherein the top section top has a perimeter defining an opening with a removable cover covering the top section opening.

8. The invention of claim 7 further comprising a bag holding means for holding a bag having a bag top opening with the bag top opening held around the opening defined by the top of the top section.

9. The invention of claim 8 wherein the bag holding means comprises a grip extending outward from the top perimeter of the top section.

10. A garbage can usable over a ground surface comprising:
a) a bottom section having a top defining a perimeter, a bottom, a left side, a right side, a front, a back and said top defining an opening and wherein the front and back have a length and the front length is less than the back length;
b) a top section having a top, a bottom defining a perimeter, a left side, a right side, a front, a back and defining opening in the bottom said top, front and back having a length;
c) a connecting means for releasably connecting the bottom of the top section to the top of the bottom section;
d) a mounting means attached to the bottom section and for holding an axle and at least one wheel rotationally mounted to allow vertical or horizontal positioning of the back of the bottom section and wherein the top section comprises a handle attached to the back and extending above the bottom.

* * * * *